Feb. 22, 1938. H. V. PUTMAN 2,109,221
ELECTRICAL APPARATUS
Filed Feb. 14, 1934 2 Sheets-Sheet 1

WITNESSES:
E. A. McCloskey
Wm. C. Groome

INVENTOR
Henry V. Putman.
BY
Franklin E. Hardy
ATTORNEY

Feb. 22, 1938. H. V. PUTMAN 2,109,221
ELECTRICAL APPARATUS
Filed Feb. 14, 1934 2 Sheets-Sheet 2
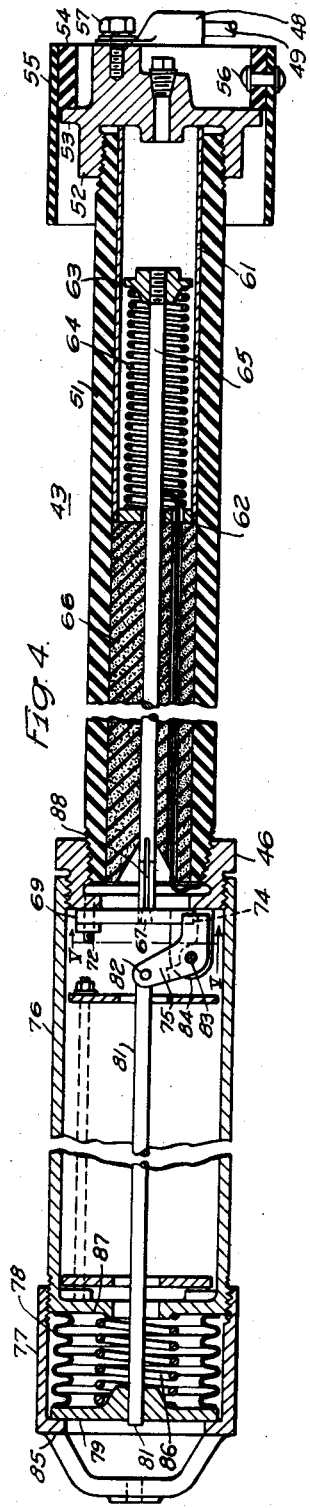
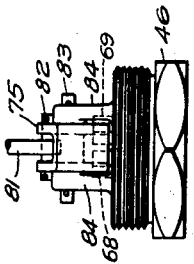
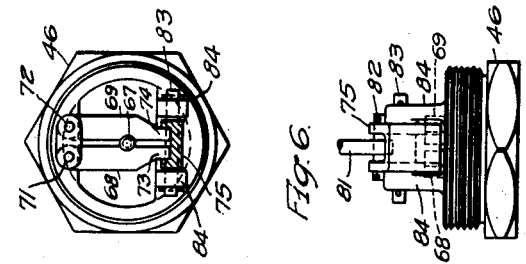
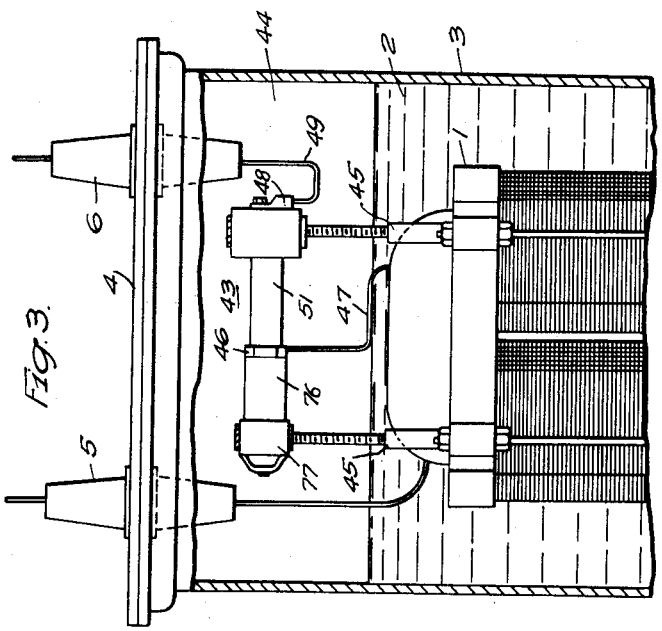
INVENTOR
Henry V. Putman.
BY
Franklin E. Hardy
ATTORNEY Patented Feb. 22, 1938

2,109,221

UNITED STATES PATENT OFFICE 2,109,221

ELECTRICAL APPARATUS

Henry V. Putman, Sharon, Pa., assignor to Westinghouse Electric & Manufacturing Company, East Pittsburgh, Pa., a corporation of Pennsylvania Application February 14, 1934, Serial No. 711,132

2 Claims. (Cl. 200—81)

My invention relates to a protective means for electrical apparatus, such as oil-immersed transformers, and more particularly to means for interrupting a circuit through the apparatus upon the occurrence of predetermined conditions of the circuit, or of the apparatus.

Such electrical apparatus is subject to different types of disturbances, one of which causes a heavy fault current to flow through the circuit of the apparatus, and another of which causes a slow disintegration of insulating material and the generation of gases forming decomposition products thereof, which may be explosive in character, and which tend to build up a pressure within the transformer casing that will eventually open up the gaskets under the casing cover and permit the gas to fill the space about the transformer. This is particularly undesirable in certain locations, for example, when the transformer is installed in a vault within a building where no proper facilities exist for ventilating the vault. It is possible, under such circumstances, for the vault to become filled with an explosive gas which, if ignited, by an electric spark, may do considerable damage.

It is, therefore, desirable that upon the sudden flow of a heavy fault current through such electrical apparatus, such as a transformer, the apparatus be disconnected from the circuit at once. It is also desirable that upon the breakdown of the insulating material, such as may be caused by a continuing or "stewing arc" between adjacent turns of the winding, the apparatus be disconnected from the line circuit before the gases produced by this phenomenon cause a pressure within the tank sufficient to do any damage.

In accordance with my invention, I have provided a circuit interrupting mechanism for preventing explosions that may occur in transformers or similar electrical apparatus, as a result of either a short circuit current or a "stewing arc", and that will minimize or prevent explosions from gases given off as the result of a heavy fault arc occurring suddenly.

In the usual type of transformer, the pressure developed upon the sudden flow of heavy fault current my be so high as to force oil and gas out under the cover of the tank or even to open the welded tank seams. However, such disturbances usually originate as minor faults or "stewing arcs" between local parts of the apparatus and become progressively worse if not checked. Such an arc causes decomposition of the oil and of the solid insulation of the apparatus producing explosive gaseous products that build up a gas pressure within the tank which may finally become sufficient to rupture the tank.

If the transformer is disconnected from its power circuit when the pressure within the transformer tank, due to gas given off as the result of a stewing arc, has reached a value somewhat below that which might force the gas past the gaskets, an explosion in the vault containing the transformer may be prevented, and the likelihood of a heavy arc occurring between terminals within the transformer as a result of a lowering oil level within the tank is also lessened. The probability of an arc occurring inside the transformer casing, and of the accompanying gas pressure becoming severe, is reduced if the transformer is disconnected from its power circuit within a few cycles after the occurrence of a heavy fault current, which is quicker than it would ordinarily be disconnected if it were necessary to wait for a circuit breaker in the power feeder system of the trip.

An object of my invention is the provision of a protective system for electrical apparatus that will operate to disconnect the apparatus from its associated power circuit, either upon the occurrence of un-normal operating conditions of the apparatus resulting in the disintegration of the insulating material, or upon the sudden occurrence of a high fault current.

A further object of my invention is the provision of such a system that shall be compact in structure, inexpensive to manufacture, simple to replace and effective in its operation.

It is a further object of my invention to provide a disconnecting device that is operable either upon the melting of a fusible element, or upon the tripping of a mechanically operated release mechanism, to interrupt an electric circuit.

In the accompanying drawings,

Fig. 3 is a view partly in elevation and partly in section of another embodiment of my invention.

Fig. 4 is an enlarged sectional view of the circuit interrupting device shown in Fig. 3.

Fig. 5 is a view along the lines V—V of Fig. 4 showing the latching mechanism mounted on the terminal member 46; and Fig. 6 is a bottom view of this terminal member.

Figure 1:
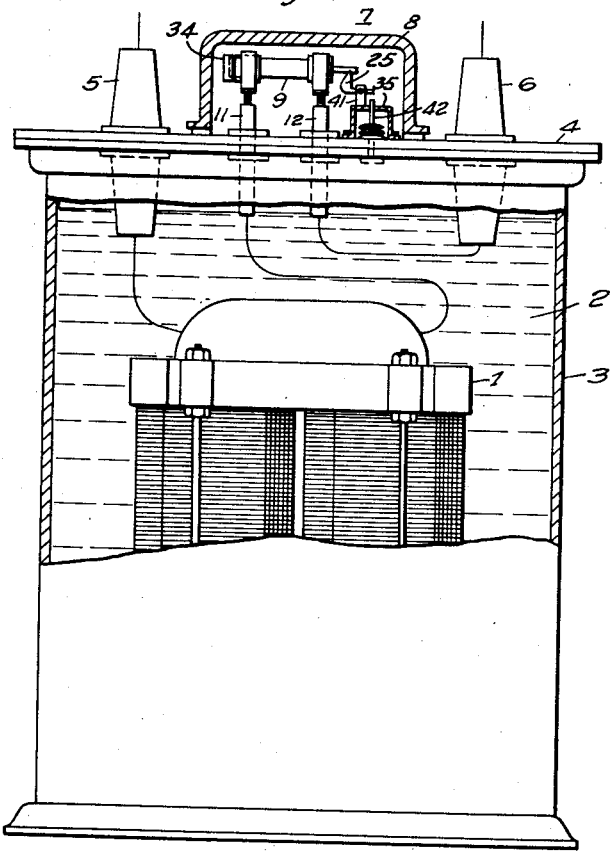
Figure 1 is a view, partly in elevation and partly in section, of a transformer embodying apparatus containing the protective features of my invention.
Figure 2:
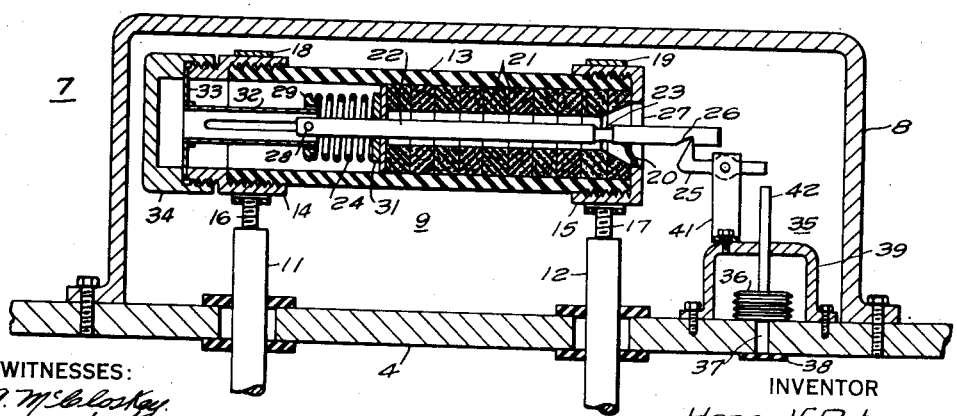
Fig. 2 is an enlarged sectional view showing details of certain portions of the apparatus shown in Fig. 1.

Referring to the drawings, and particularly to Fig. 1 thereof, a transformer 1 is shown immersed in oil or other suitable insulating and cooling liquid 2, contained within a tank or casing 3 upon which is mounted a cover 4. Terminal bushings 5 and 6 are illustrated mounted upon the cover of the tank and through which extend conductors that connect the transformer windings to an associated power circuit. The circuit from one of the bushings 6 to the transformer winding is completed through a circuit-interrupting device indicated generally at 7, mounted within a casing 8 upon the cover of the transformer, and comprising an expulsion type fuse or switch 9 mounted upon bushings 11 and 12 that extend through the cover of the transformer.

The circuit interrupting device 9 may be of any suitable construction, such as the boric acid type switch covered generally in a copending application of Joseph Slepian, Serial No. 568,554 filed October 13, 1931, now Patent No. 2,077,276, patented April 13, 1937, and assigned to the same assignee as this application.

The circuit interrupting device or boric acid fuse 9 as illustrated, comprises a tubular enclosed casing 13 of fibre or other suitable insulating material having metal terminal members 14 and 15 that engage, respectively, terminals 18 and 19 carried by the studs 16 and 17 extending through the transformer tank cover 4. The casing member 13 is lined on the inside with solid boric acid 21 here illustrated as blocks or washers having openings through the central portion thereof. A movable switch element or rod 22, having a fusible portion 23, extends through the openings in the boric acid blocks and is biased by a spring 24, which is adapted to rapidly move the rod 22 through the opening in the boric acid blocks upon the fusing of the portion 23, thus drawing an arc in contact with the walls of the boric acid lining of the fuse structure, which causes the boric acid to be decomposed giving off water vapor that flows longitudinally through the arc and out the end of the expulsion chamber formed by the openings in the boric acid blocks.

The contact member or movable plunger 22 is normally held in its illustrated or circuit-closing position by a latch 25 that extends into a notch 26 in one end of the rod 22. The terminal member 15 is formed as a cap suitably secured to the tube 13 and provided with an opening 27 centrally of the end thereof which provides for discharge of the arc gases from the expulsion chamber. One end of the rod 22 is electrically connected to the terminal cap 15 by some suitable connecting means as, for example, a wire 20 fastened to the cap 15 and connected with the rod 22. The mechanical strength of the connection between the wire 20 and the rod 22 is not sufficient to prevent the rod from being actuated by the spring 24 upon the release of the latch 25. The other end of the rod 22 is connected at 28 to an annular collar 29. The compression spring 24 is positioned between the collar 29 and a washer 31 at the end of the series of boric acid blocks or discs 21, and is electrically connected to the terminal 14 through a conducting tube 32, which slidably engages the collar 29, and a metal disc support 33 therefor, which is secured in conducting relation against the end of the terminal member 14 by a cap 34 that is suitably attached to the terminal 14.

A pressure-actuated trip device 35 is provided, comprising a sylphon bellows 36, the interior of which is connected by a passageway 37 with the interior of the transformer casing. A thin wall or diaphragm 38 of paper or other comparable material designed to rupture at a predetermined pressure, may, if desired, be placed over the end of the passageway 37. A casing 39 is illustrated as surrounding the bellows 36 upon which a supporting member 41 for carrying the latch 25 may be mounted. A rod 42 extends upwardly from the sylphon bellows and is so positioned as to trip the latch 25 and release the plunger 22 upon the occurrence of a predetermined pressure within the transformer tank. Upon melting of the fuse element 23 by the flow of a predetermined value of current through the switch rod 22, or upon the tripping of the latch 25 by a predetermined pressure within the transformer tank, the spring 24 draws the switch member 22 through the arc-extinguishing chamber centrally of the boric acid blocks 21, thus drawing an arc in contact with the narrow walls of the chamber surrounding the arc. The gas given off by the boric acid is caused to flow through this central chamber and out the opening 27 in the cap terminal 15 and in so doing extinguishes the arc.

Referring to the embodiment of the invention illustrated in Figs. 3 to 6, Fig. 3 shows a transformer that is, in general, similar to that illustrated in Fig. 1. A boric acid fuse or switch 43 that is connected in circuit with one of the transformer windings is mounted within the transformer, in the gas space 44 above the insulating liquid 2, by any suitable means such as the supports 45. One terminal 46 of the fuse or switch is connected to one end of the transformer winding by a conductor 47, and the other terminal 48 is connected to the conductor 49 extending through the bushing 6 in the cover of the transformer casing.

Referring particularly to Fig. 4, the boric acid fuse comprises a casing or tube of insulating material 51 that is attached at one end to switch terminal 46, and at the other end to a conducting member 52, provided with a flange 53 that is supported against the end of an annular member 54 attached to an outer protecting or guard member 55 by any suitable means such as the rivets 56. The fuse terminal 48 may be attached to the conducting member 52 by means of a screw or bolt 57.

A conducting sleeve 61 is connected to the terminal member 52 and extends along the inside of the insulating tube 51 to a partition 62 of conducting material positioned transversely of the tube. This sleeve serves as a guide for a movable plunger or piston 63 that is attached to a switch member or rod 65, and is biased by a compression spring member 64 that extends between and engages the partition 62 and the plunger 63, tending to force them apart. The switch member or rod 65, extends through a central opening in the partition 62 and through a central opening in the solid boric acid 66 leading from the partition 62 to the terminal 46 at the other end of the tube 51. The rod 65 terminates in a cone-shaped portion 67 that is adapted to be gripped by, and held between, the latching members 68 and 69, best shown in Fig. 5, that are pivotally mounted at 71 and 72, and the lower ends, 73 and 74, of which are held adjacent each other by a U-shaped latch 75 which, in its illustrated position, causes the jaws of the latches 68 and 69 to be pressed tightly against the cone-shaped end of the rod 65 and prevent it from being actuated to its circuit opening position.

A tubular casing member 76 extends from the annular terminal member 46 in a direction opposite to the boric acid fuse, to the outer end of which a sleeve 77 is attached enclosing a sylphon bellows 78, one end of which engages a piston 79 that is connected to the outer end of an operating rod 81, the other end of which is connected, by a pivot 82, to the latch member 75. The member 75 is of the general shape of a bell crank lever, pivotally mounted at 83 on the supporting arms 84 that extend forwardly from the terminal member 46, as best shown in Fig. 6. The piston 79 attached to the end of the rod 81, is normally held in engagement with a flange 85 on the outer end of the sleeve 77 by a spring 86 that extends between the piston and the inwardly extending wall portion 87 of the casing 76. The sylphon bellows 78 also extends between the piston 79 and the wall 87.

In its circuit-closing position current flows from the transformer through conductor 47, terminal 46, the latch members 68 and 69 attached thereto to the cone-shaped end 67 of the switch rod 65, through the rod 65, the piston 63, the spring 64 and sleeve 61, the conducting end member 52, and the terminal 48, to the conductor 49. A fusible link 88 is provided in the end of the rod 65 adjacent the terminal 46, which fuses upon the flow of an overload current, thus detaching the main portion of the rod 65 from the cone-shaped portion 67, and permitting the spring 64 to operate the plunger 63 and the rod 65 toward the right, thus carrying the rod 65 through the arc-extinguishing chamber within the central opening through the core of solid boric acid 66.

As will appear, the pressure of the gas within the transformer tank acts directly against the outer wall of the piston 79, and should this pressure become sufficient to overcome the biasing action of the spring 86, thus forcing the piston 79 toward the right, the rod 81 and the piston 82 of the bell crank latching member 75 would be similarly moved, thus rotating the member 75 about the fixed pivot 83 and moving the forwardly extending or U-shaped end thereof downwardly, thus releasing the end portions 73 and 74 of the latch members 68 and 69 and permitting them to separate and release their grip upon the cone-shaped portion 67 of the switch rod. This rod is then actuated by the spring 64 in the same manner as if the fusible link 88 had been melted and draws an arc between the latch members 68 and 69 and the end of the rod into the arc-extinguishing chamber within the boric acid core 66.

Many modifications of the specific apparatus illustrated and described may be made within the spirit of my invention and I do not wish to be limited otherwise than by the scope of the appended claims.

I claim as my invention:

1. A circuit-interrupting device comprising a cylindrical structure, a spring-actuated plunger in one end thereof, a latch for holding the plunger in a circuit-closing position, fluid-pressure-responsive means aligned with the plunger in the other end of said structure for releasing said latch, and a fusible link positioned between the plunger and the latch and adapted to rupture when the flow of current through the device exceeds a given value.

2. In a protective system for an encased electrical apparatus, the combination of a device adapted to interrupt the apparatus energizing circuit comprising a spring-actuated plunger, a latch for holding said plunger in a circuit-closing position against the action of said spring, means for releasing said latch when the pressure within the apparatus casing exceeds a given value, and a fusible link positioned between the plunger and the latch, said link being adapted to rupture when the flow of current through the device exceeds a given magnitude.

HENRY V. PUTMAN.